(12) United States Patent
Koopman et al.

(10) Patent No.: US 8,695,483 B2
(45) Date of Patent: Apr. 15, 2014

(54) HOLDER ASSEMBLY FOR A POWDERED INGREDIENT FOR PREPARING AN INSTANT DRINK

(75) Inventors: Carlos Nicolaas Jozef Maria Koopman, Heerhugowaard (NL); Johannes Theodorus Emerentia Huiberts, Spanbroek (NL); Romanus Eduard Verhoeven, Heerhugowaard (NL)

(73) Assignee: Bravilor Holding B.V. (NL)

( * ) Notice: Subject to any disclaimer, the term of this patent is extended or adjusted under 35 U.S.C. 154(b) by 623 days.

(21) Appl. No.: 12/601,235

(22) PCT Filed: May 20, 2008

(86) PCT No.: PCT/NL2008/050297
§ 371 (c)(1),
(2), (4) Date: Apr. 14, 2010

(87) PCT Pub. No.: WO2008/143505
PCT Pub. Date: Nov. 27, 2008

(65) Prior Publication Data
US 2010/0199850 A1    Aug. 12, 2010

(30) Foreign Application Priority Data
May 24, 2007  (NL) ..................................... 2000662

(51) Int. Cl.
*A47J 31/00* (2006.01)
(52) U.S. Cl.
USPC ....................................................... 99/289 R
(58) Field of Classification Search
USPC ................ 222/563, 412, 413; 99/289 R, 290, 99/323.3, 305, 306, 304
See application file for complete search history.

(56) References Cited

U.S. PATENT DOCUMENTS

| 4,665,862 A | * | 5/1987 | Pitchford, Jr. | 119/51.11 |
| 4,934,563 A | * | 6/1990 | Torita et al. | 222/14 |
| 5,312,020 A | * | 5/1994 | Frei | 222/129.1 |

(Continued)

FOREIGN PATENT DOCUMENTS

| EP | 0207303 A |   | 1/1987 |
| GB | 2345252 A |   | 7/2000 |
| JP | 10049746  | * | 2/1998 |

OTHER PUBLICATIONS

International Search Report, in connection with International Application No. PCT/NL2008/050297, mailed Jul. 21, 2008.

*Primary Examiner* — Dana Ross
*Assistant Examiner* — Frederick Calvetti
(74) *Attorney, Agent, or Firm* — Meyer IP Law Group

(57) ABSTRACT

The invention relates to a holder assembly (1) for a powdered ingredient (4) for preparing an instant drink. The assembly comprises a holder, a conveyor screw (6), an outflow channel (7) provided on the holder for dispensing ingredient (1), a threshold plate (9) extending into the outflow channel (7), and also a shut-off valve (10) for shutting off the outflow channel (7). The shut-off valve (10) comprises a shut-off body (11) which can be moved back and forth in the longitudinal direction of the conveyor screw (6) between a release position and a shut-off position. In the release position the shut-off body (11) is located downstream of the threshold plate (9), set apart therefrom. In the shut-off position the shut-off body (11) is located next to the threshold plate (9) in such a way that the shut-off body (11) and the threshold plate (9) together shut off the shut-off channel (7). The invention further relates to a drink preparation means comprising a holder assembly (1) according to the invention.

18 Claims, 3 Drawing Sheets

(56) References Cited

U.S. PATENT DOCUMENTS

| | | | |
|---|---|---|---|
| 5,330,078 A * | 7/1994 | Ficken et al. | 222/129.4 |
| 5,927,553 A * | 7/1999 | Ford | 222/129.4 |
| 6,149,035 A * | 11/2000 | Gorski et al. | 222/129.4 |
| 6,561,079 B1 * | 5/2003 | Muller et al. | 99/282 |
| 7,111,759 B1 * | 9/2006 | Gorski et al. | 222/145.6 |
| 7,398,725 B2 * | 7/2008 | Rebordosa et al. | 99/289 R |

* cited by examiner

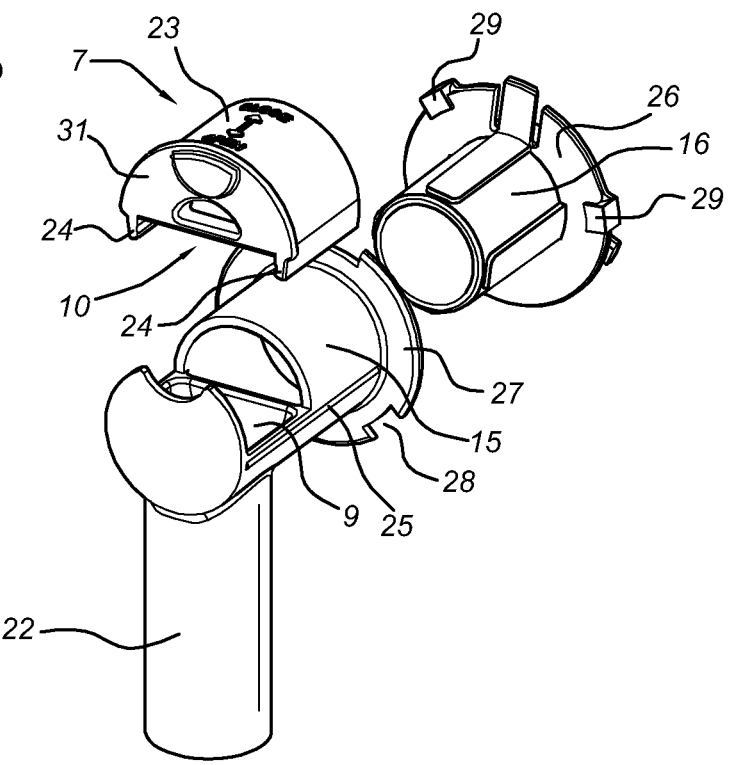
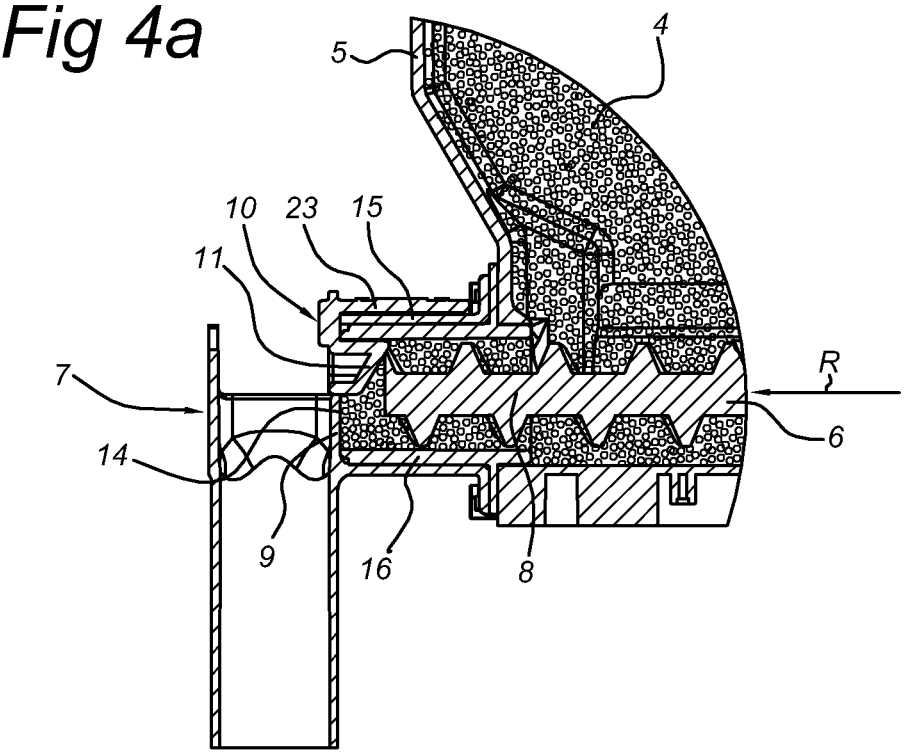

HOLDER ASSEMBLY FOR A POWDERED INGREDIENT FOR PREPARING AN INSTANT DRINK

TECHNICAL FIELD OF THE INVENTION

The present invention relates to the field of the preparation of instant drink from a powdered ingredient. The present invention relates in particular to a holder assembly which is used in this case for a powdered ingredient for preparing the instant drink.

BACKGROUND OF THE INVENTION

In drink preparation means for dispensing drinks, and in particular for dispensing hot drinks such as coffee and hot chocolate, powdered ingredient is often used, which ingredient, when mixed with hot water, produces the drink. This powdered ingredient is stored in the means in a holder which is provided at the bottom with a conveyor mechanism with which the ingredient is guided via an outflow system in the form of a tube or chute to the filling opening of a mixing unit. In the mixing unit the ingredient is then mixed with water and usually also dissolved in the water, after which it flows out of the mixing unit into a collection reservoir such as a cup, a beaker or a jug. A drink preparation means of this type, in particular the mixing unit thereof, is described in WO-03/068039 and also in NL 2000164 which has not yet been published.

Drink preparation means of this type generally have to be cleaned and maintained regularly, in many cases even every day. For this purpose, the mixing unit or mixing units can be wholly or partly disassembled or removed from the drink preparation means. The ingredient holder or ingredient holders can also be removed from the drink preparation means, either to clean them or to be able to fill them with powdered ingredient more easily.

During maintenance of the drink preparation means or when the ingredient holder is removed from the drink preparation means, it is convenient if the outlet of the holder can be shut off. Additionally, it is advantageous in the outflow system (connecting the holder to the mixing unit) can be placed aside.

In order to be able to shut off the outlet of the holder, the outflow systems of known drink preparation means are usually provided with a shut-off valve. This shut-off valve conventionally consists of either a rotatable part, which can be rotated from a position located outside the passage of the outflow system into the passage of the outflow system in such a way that this passage is shut off, or a slide which can be slid at right angles to the throughflow direction of the outflow system into the passage of the outflow system in order thus to shut off this passage.

In shut-off valves of this type the powdered ingredient accumulates against the shut-off member on the side of the holder that is located upstream of the shut-off member. Along the shut-off member this accumulation of powdered ingredient forms a straight plane which is at right angles to the throughflow direction of the outflow system. When the shut-off valve is opened, the powder will start to slide off in this square plane, as a result of which a portion of the powder will enter the mixing unit via the remainder of the outflow system.

For setting aside the outflow system, it is known to configure this outflow system so as to be rotatable with respect to the holder, thus allowing it to be twisted off. In practice, twisting-off of the outflow system has also been found to cause accidental detachment of powder from the accumulation upstream of the shut-off valve, the powder then entering the mixing unit via the outflow system. A further drawback of the known shut-off valves is that it is easy to forget to reopen the shut-off valve prior to normal operation. If the conveyor means (usually a conveyor screw) at the bottom of the holder then starts to convey powder in the downstream direction of the outflow system, this powder is then unable to escape as a result of the closed shut-off valve. This then causes the shut-off valve, the conveyor means or other components to break or—in a more beneficial case—the powder to take a different escape route and enter not the mixing unit but rather a different part of the drink preparation, and this is not desirable either.

The object of the present invention is to improve the capacity to shut off the outflow system, in particular the outflow channel thereof provided on the holder. The aim of this is to minimize uncontrolled dispensing of spilt powdered ingredient from the holder.

SUMMARY OF THE INVENTION

According to the invention, the aforementioned object is achieved by providing a holder assembly for a powdered ingredient for preparing an instant drink, comprising:
  a holder;
  a conveyor screw provided in the holder along the base of the holder;
  an outflow channel provided on the holder for dispensing that ingredient, an end of the conveyor screw protruding into the outflow channel;
  a threshold plate which extends transversely to the longitudinal direction of the conveyor screw and which is attached in the outflow channel downstream of that one end of the conveyor screw;
  a shut-off valve for shutting off the outflow channel;
wherein the shut-off valve comprises a shut-off body which can be moved back and forth in the longitudinal direction of the conveyor screw between a release position and a shut-off position;
the shut-off body being located in the release position on the downstream side of the threshold plate, set apart from that threshold plate; and
the shut-off body being located in the shut-off position, viewed in a direction transversely to the longitudinal direction of the conveyor screw, next to the threshold plate in such a way that the shut-off body and the threshold plate together shut off the outflow channel.

The threshold plate prevents, during normal use when the shut-off body is in the release position, grains of powdered ingredient from rolling while the conveyor screw is stationary into the outflow system (past the threshold) and entering the mixing unit in an undesirable manner. This can occur, for example, as a result of vibrations originating from the environment of the drink preparation means. The threshold plate slows down the rolling-forward of the grains. The threshold plate also helps to dispense the powdered ingredient in precisely measured amounts (depending on whether the conveyor screw is allowed to operate for a longer or shorter period of time). As a result of now configuring the shut-off body so as to be displaceable back and forth in the longitudinal direction of the conveyor screw from a release position located downstream of the threshold plate to a position located, viewed transversely to the throughflow direction, next to the threshold plate, the outflow channel has a completely shut-off cross section at the location of the threshold plate. By sliding the shut-off body during shutting-off in the upstream direction to at least next to the threshold plate, powdered ingredient is pushed back in the upstream direction, even if it is already above the threshold plate. Known shut-off valves lack this active push-back function; still less can they can push back powdered ingredient located, viewed in the throughflow direction, at the same height as the threshold plate.

In order further to improve the shutting-off, it is advantageous according to the invention if the shut-off body protrudes in the shut-off position, viewed from the downstream side of the threshold plate in the upstream direction, along and past the threshold plate on the upstream side of the threshold plate. This provides further pushing-back of powdered ingredient to after the threshold plate. This further reduces the risk of grains of powdered ingredient accidentally passing the threshold plate when the shut-off body is slid back to the release position.

According to a further embodiment, it is in this case advantageous if the upstream end face of the shut-off body extends at such an inclination that this end face, viewed in the shut-off position and looking from the conveyor screw in the downstream direction, runs obliquely toward the threshold plate. This further reduces the risk of grains of powdered ingredient accidentally becoming detached and passing the threshold plate when the shut-off body is slid back to the release position.

According to a further, more specific embodiment, it is in this case advantageous if this inclination encloses with the longitudinal axis of the conveyor screw an angle of from 30° to 60°, in particular 40° to 45°. Powdered material displays what is known as a slide-off angle, along which layers of the powdered material tend to slide off. When powdered material is deposited as a mound of sand, then the natural gradient of the mound corresponds substantially to the slide-off angle of the sand from which the mound is formed. If this natural gradient is exceeded, the sand immediately tends to roll downward along the inclination of the mound. What is known as the slide-off angle of powdered ingredients for preparing an instant drink has been found in tests to be approximately 40° with respect to the horizontal plane—although lower values also occur—when the powdered ingredient lies freely on a horizontal plate. When the same powdered ingredient lies in a horizontal tube, the slide-off angle has been found in tests to be much greater, usually approx. 10° with erratic samples to approx. 20° greater. Assuming that the inclination of the shut-off body is at most 60°, there is little risk of powder particles becoming detached in the outflow channel and of powder particles rolling over the threshold plate when the shut-off body is slid back to the release position. Assuming that the inclination is at least 30°, the threshold plate can push back the powdered ingredient, on displacement of the threshold plate from the release position to the shut-off position, without the resistance becoming too great to be able to reach the shut-off position. Assuming that the inclination is an angle of between 40° and 45°, the shut-off body can be brought relatively easily into the shut-off position;

the inclination imposed by the shut-off body on the powdered ingredient is sufficiently smaller than what is known as the slide-off angle of the powdered ingredient in a tube, in the present case the outflow channel;

should the operator forget to slide the shut-off body back to the release position, a very significant portion of the force exerted on the closed shut-off body by the powdered ingredient as the conveyor screw rotates acts in the slide-open direction of the shut-off body. This prevents damage to the outflow channel and allows this force exerted on the shut-off body to be used in order still to open this shut-off body.

According to a further embodiment, it is advantageous if the threshold plate has a free edge which, in the shut-off position, is turned toward the shut-off body; and if said free edge is bevelled or rounded on the downstream side of the threshold plate. The bevelling/rounding of the free edge prevents particles of powdered ingredient, also referred to in the present document as grains, from being able to continue lying on said edge. Grains lying on said edge could be pulverized into dust when moving the shut-off body from the release position to the shut-off position and vice versa. This dust would then still be able to leave the outflow system, despite the fact that the holder assembly is closed. The bevelling/rounding, which prevents grains from being able to continue lying on the free edge, has the further advantage of preventing, during normal operation as well, for example vibrations from the environment from allowing grains still to enter the mixing unit via the outflow system at an undesirable moment and ultimately entering a reservoir containing ready-to-consume drink. In particular if that reservoir contains a different drink from that provided with the 'spilt' ingredient, this would spoil the taste. It is in this connection also advantageous if the holder further comprises powdered ingredient for preparing an instant drink and if said free edge is bevelled or rounded in such a way that, when the free edge extends horizontally, powdered ingredient lying on the free edge falls from the free edge.

In addition to, though also independently of rounding/bevelling of the free edge, the continued lying of grains of ingredient on the free edge can also be combated by configuring the threshold plate, or at least the free edge thereof which is turned in the shut-off position toward the shut-off body, so as to be very thin, i.e. with a thickness of from 1.5 to 2 mm or even thinner.

According to a further embodiment of the invention, it is advantageous if the shut-off valve is provided on the holder assembly, in particular the outflow channel, in such a way that the shut-off valve is displaceable in the downstream direction counter to a resistant force, which resistant force is of such magnitude that the sliding body can be slid back toward the release position under the influence of ingredient propelled forward by the conveyor screw. The resistant force against sliding-open of the shut-off valve is required to prevent the shut-off valve from accidentally sliding open while it should be closed. However, selecting this resistant force in such a way that the shut-off valve can be opened under the influence of the propelling effect of the conveyor screw prevents components from breaking or becoming damaged during use of the drink preparation means if the operator may have forgotten to return the shut-off valve to the release position. According to the invention, the resistant force can be produced in a broad range of ways. Use may, for example, be made of a compression spring. However, preferably, the resistant force is obtained by clamping fastening of the shut-off valve to the holder assembly, in particular the outflow channel. On the one hand, this saves a separate component, such as a spring, and, on the other hand, it eliminates the need in the release position for locking means to be able to resist a prestressing force. To prevent accidental sliding-open of the sliding body, the aforementioned resistant force will be at least 0.5 N, preferably 1 N or more. To allow sliding-open of the sliding body under the influence of the propelling effect of the conveyor screw, the aforementioned resistant force will be at most 10 N, preferably at most 5 N. In tests the shut-off body has been found to operate reliably when the aforementioned resistant force is in the range of from approximately 1 to 3 N. (N represents in the present document in each case a newton as a unit of force).

To allow the outflow system to be easily set aside, in particular by twisting, during maintenance and cleaning operations, it is according to the invention advantageous if the outflow channel comprises a first tube part which is fastened to the holder so as to be able to rotate about the longitudinal axis of that tube part, and if the threshold plate and the shut-off valve are provided on that first tube part to be rotatable, at least in the shut-off position, together with that first tube part with respect to the holder about the longitudinal axis of the outflow channel. By providing the threshold plate and the shut-off valve both in the rotatable first tube part, the shut-off mechanism can also rotate as usual when the outflow system is twisted off and thus does not impede the twisting-off of the outflow system.

To be able easily to reach the outflow system for the purposes of maintenance, such as cleaning, it is according to the invention advantageous if that first tube part is fastened to the holder, in particular the second tube part, in a detachable and recouplable manner.

In terms of design, it is in this case advantageous if the outflow channel comprises a second tube part which is fastened to the holder, which extends concentrically in the first tube part, and which acts as a bearing for the rotatable first tube part, and if the aforementioned one end of the conveyor screw protrudes into this second tube part. This provides in a simple and reliable manner durable, effective fastening, allowing the outflow system to be twisted off, of the first tube part.

With a view to simple and reliable mounting of the conveyor screw, it is in this case advantageous if the second tube part has an internal diameter corresponding substantially to the external diameter of the conveyor screw in such a way that this second tube part acts as a bearing for the conveyor screw.

According to a further embodiment of the invention, the holder comprises powdered ingredient for preparing an instant drink such as tea, iced tea, "café frappé" (also known as iced coffee), lemonade, soup, broth, fruit juice, milk or chocolate milk. The instant drink to be prepared can in this case be both a cold and a hot drink.

According to a further aspect, the present invention relates to a drink preparation means for preparing an instant drink, wherein the drink preparation means comprises:
at least one holder assembly according to the invention;
a mixing unit for mixing and dissolving powdered ingredient originating from the holder assembly with water or in water; and
a water supply system for supplying water to the mixing unit.

EMBODIMENT OF THE INVENTION

The present invention will be described hereinafter with reference to an embodiment illustrated in the drawings, in which:

FIG. 3 is an exploded view of a portion of a holder assembly according to the invention;

Figure 1:
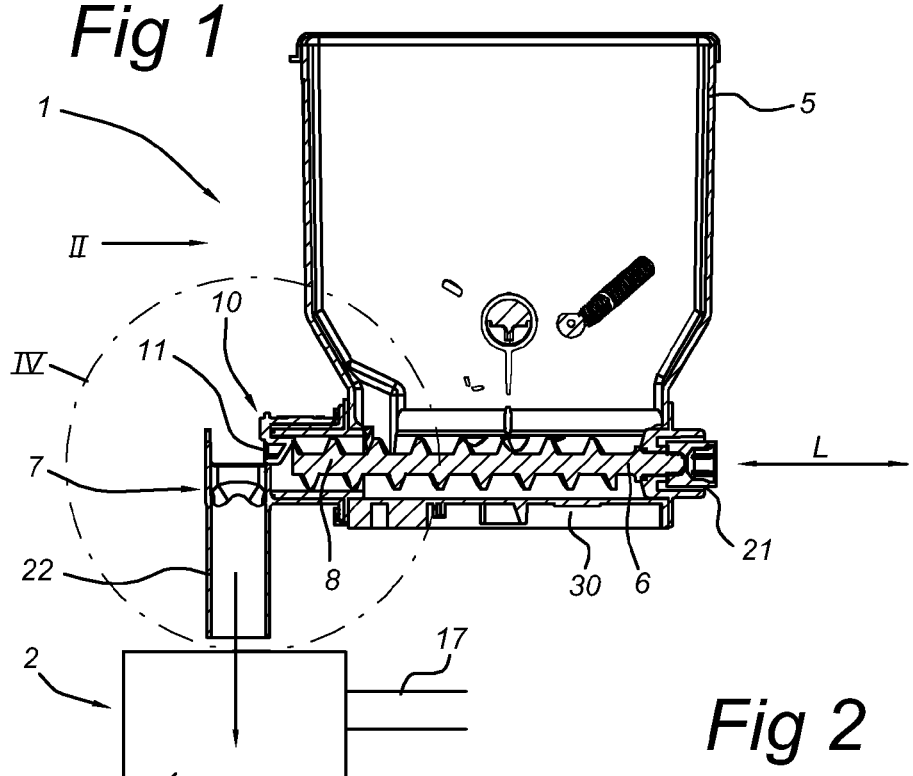
FIG. 1 is a schematic representation, partly in cross section, of a drink preparation means according to the invention comprising a holder assembly according to the invention.
Figure 2:
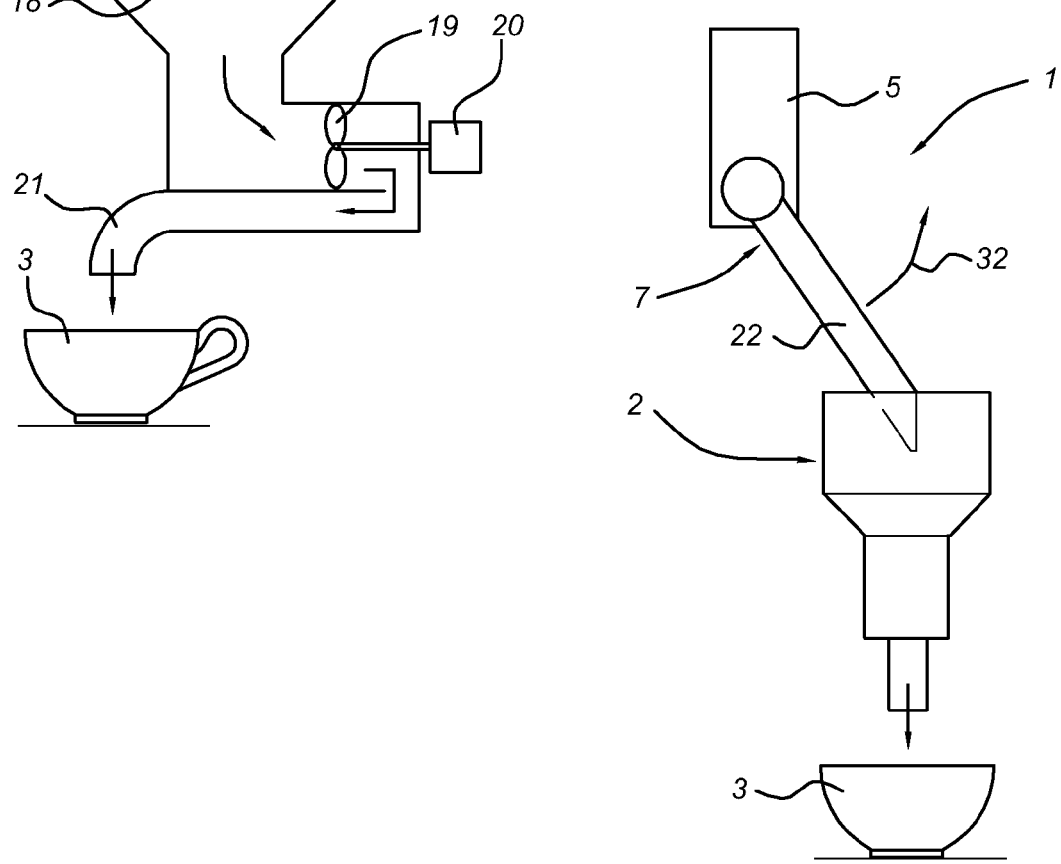
FIG. 2 is a schematic view of the drink preparation means from FIG. 1, which view corresponds to arrow II in FIG. 1.

FIGS. 1 and 2 show a drink preparation means according to the invention. This drink preparation means comprises a holder assembly 1 according to the invention; a mixing unit and a water supply system 17. The mixing unit 2 is in this case illustrated highly schematically and may be of many different types. In this example the mixing unit 2 comprises a mixing space 18 with a funnel-shaped inlet part to a mixing member 19 in the form of a rotor 19 which is driven by a motor 20. Water is supplied to the mixing space 18 via the line 17 and powdered ingredients are supplied to the mixing unit 2 via the channel 22. Under the action of the rotor, the water is mixed with the ingredient, wherein the ingredient can dissolve in the water. As is indicated by the arrows, the mixture which is obtained is then dispensed to a cup or beaker 3 via an outflow 21. The user can then drink the drink which is obtained out of the cup 3.

The holder assembly 1 according to the invention comprises a holder 5 which, as is known per se, is provided with a conveyor screw 6 extending along the base 30 of the holder 5. The holder assembly further comprises an outflow channel 7 which is fastened to the holder 5. The conveyor screw 6 protrudes at one end 8 into the outflow channel 7. At the other end the conveyor screw 6 is connected to the drive means 21 to be able to cause the conveyor screw to rotate. The conveyor screw 6 has a longitudinal direction L and will, when rotated in the correct direction, convey powdered ingredient 4, which is located in the holder 5 as indicated by arrow R (FIG. 4a), in the direction of the outflow channel 7. It is thus possible, for preparing a cup of drink, to drive the conveyor screw 6 over a predetermined period of time, so that a desired amount of powdered ingredient is dispensed from the holder 5 to the mixing unit 2 via the outflow channel 7.

The outflow channel 7 will be examined hereinafter in greater detail with reference to FIGS. 3, 4 and 5. FIG. 3 is a perspective exploded view of the outflow channel 7. FIGS. 4a, 4b and 4c show as detail IV from FIG. 1 the outflow channel in various states, and FIG. 5 shows in greater detail the outflow channel in the state in which the passage through the outflow channel is completely closed.

With reference to FIG. 3, the outflow channel 7 is made up of three components which can each be made of plastics material by injection-moulding. The first component is L-shaped and made up of a first tube part 15 having thereon a tubular dispensing part 22. It should be noted that the tubular dispensing part 22 does not have to be a closed tube but can also be an open chute. A flange 27 is further provided on the first tube part 15. The second component is a second tube part 16 on which a flange 26 is formed. The third component is a shut-off valve 10. This shut-off valve 10 is made up of a semicylindrical cap 23, a semicircular plate 31, two clamping edges 24 and a shut-off body 11. The clamping edges 24 are provided on the insides with guide grooves. Two guide ribs 25 are provided on the first tube part 15. In the assembled state the clamping edges 24 engage with the first tube part 15 in a clamping manner in such a way that the guide ribs 25 engage with the aforementioned guide grooves. The shut-off valve 10 is thus displaceable back and forth, as indicated by double-headed arrow S (FIG. 4c) along the first tube part 15, between a release position (FIGS. 4b and 4c) and a shut-off position (FIGS. 4a, 1 and 5). As a result of the fact that the clamping edges 24 engage with the first tube part 15 in a clamping manner, a frictional force must be overcome for this reciprocating displacement. This frictional force is of magnitude such that a) the displacement back and forth of the shut-off valve 10 can easily be carried out by hand; b) accidental displacement (in particular sliding-open) is prevented; and c) sliding-open is possible under the influence of the propelling effect of ingredient pushed forward by the conveyor screw. This frictional force is thus preferably in the range of from approximately 1 N up to and including approximately 3N. Somewhat greater values of up to 5 to 7 N can also still operate effectively.

In the assembled state the second tube part 16 protrudes into the first tube part 15. The first tube part 15 and the second tube part 16 are in this case fixed to one another via the flanges 26 and 27 by means of a type of bayonet closure. This bayonet closure is obtained by providing on the flange 26 hooks 29 which engage around the outer diameter edge of the flange 27. In order to facilitate mutual assembly and also, if appropriate, disassembly, the flange 27 of the first tube part 15 is provided with recesses 28 to let through the hook ends of the hooks 29 during mutual insertion. Once the tube part 16 has then been rotated with respect to the tube part 15, the interlocking will have become effective.

Tube part 16 is fastened (possibly so as to be detachable and then refastenable) to the holder 5. The bayonet-like interlocking of the first tube part 15 with respect to the second tube part 16 allows the first tube part 15 to be twisted with respect to the second tube part 16. Thus, the dispensing part 22 can be swivelled from the outflow channel 7 in the direction indicated by arrow 32 (see FIG. 2). This allows the dispensing part 22 to be swivelled away for the purposes of, for example, maintenance or cleaning, so that the mixing unit 2 is exposed and more readily accessible.

The closure mechanism for shutting off the outflow channel 7 will be examined hereinafter in greater detail with reference to, in particular, FIGS. 4a, 4b, 4c and 5.

The shut-off valve 10 comprises, as stated hereinbefore, a shut-off body 11 provided on the inside of the plate 31.

A threshold plate 9 is provided at the (in FIGS. 4a, 4b, 4c and 5 left-hand) end of the first tube part 15. This threshold plate 9 shuts off roughly the bottom half of the first tube part 15. The threshold plate 9 is in this embodiment a substantially semicircular disc having a free, straight top edge 14 and a semicircular arc-shaped edge at which the threshold plate 9 adjoins the wall of the first tube part 15. The threshold plate 9 has a thickness d (see FIG. 5) of, in this example, approximately 1.5-2 mm.

The shut-off body 11 is the shape of a semicylinder with (in FIGS. 4a, 4b, 4c and 5a right-hand) bevelled end face 12. When the shut-off body 11 is in the shut-off position illustrated in FIGS. 4a and 5, the shut-off body 11 completely shuts off, together with the threshold plate 9, the passage of the first tube part 15. It will be clear to a person skilled in the art that the threshold plate 9 can in this case be somewhat larger than a semicircular disc and that the shut-off body 11 can be somewhat smaller than a semicylinder or, conversely, that the shut-off body 11 can be somewhat larger than a semicylinder and the threshold plate 9 can be accordingly smaller than a semicircle. What matters is that they together, in the state as illustrated in FIGS. 4a and 5, completely impede the passage through the first tube part 15.

When the shut-off valve 11 is in the shut-off state, as illustrated in FIGS. 4a and 5, then passage of powdered ingredient from the interior of the holder 5 to the dispensing part 22 of the outflow channel 7 is impeded. Grains of powdered ingredient can thus not pass the threshold plate 9. It is thus easily possible, with the shut-off valve in the shut-off position, to remove the entire holder 5 from the drink preparation means without the risk of spillage of powdered ingredient. As a result of the fact that the first tube part 15 is rotatable with respect to the holder 5 and as a result of the fact that the shut-off body 11 and the threshold plate 9 are both provided on the first tube part 15, it is in addition possible to swivel the outflow channel 7, as indicated in FIG. 2 by means of the arrow 32, while the shut-off valve 10 is in the shut-off position. This completely rules out the risk of spillage of particles of powdered ingredient during swivelling of the outflow channel 7.

Figure 4B:
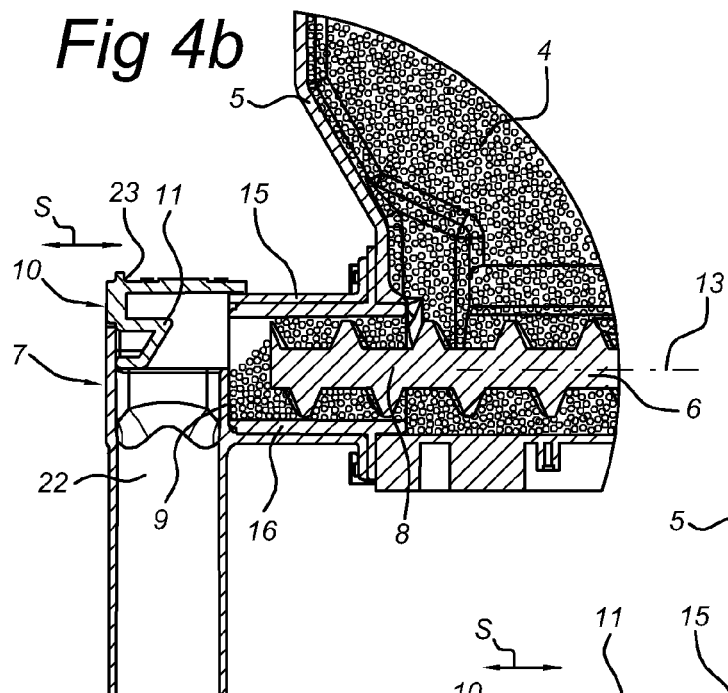
FIG. 4 shows detailed views of the detail IV from FIG. 1, FIG. 4a, FIG. 4b and FIG. 4c each representing a different state during use.
Figure 4C:
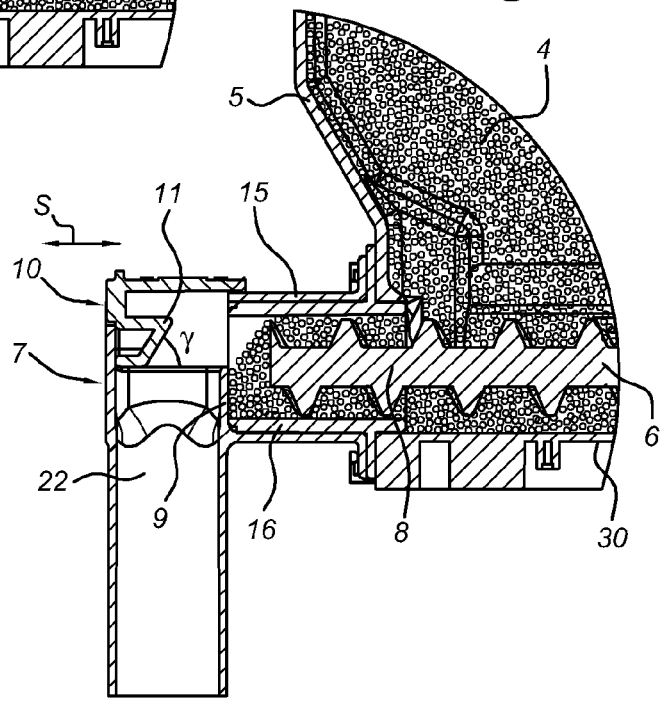
Figure 5:
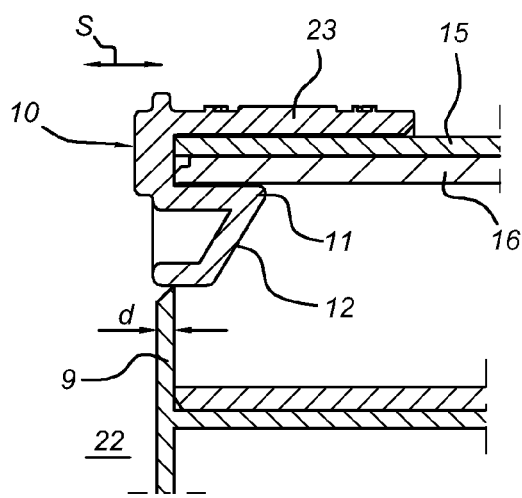
FIG. 5 is a schematic detailed view of the closure mechanism in the closed state.

When, as illustrated in FIGS. 4b and 4c, the shut-off valve 10 is in the release position, powdered ingredient 4 will be pushed beyond the threshold plate 9 as soon as the conveyor screw 6 is activated. When the conveyor screw 6 is switched off, the powdered ingredient will continue to lie at an angle of inclination of approx. 50°, as illustrated in FIG. 4c. This angle of inclination of approx. 50° corresponds to what is known as the slide-off angle of this powdered ingredient in a horizontal tube. This angle of inclination/slide-off angle will in practice be dependent on the type of powdered ingredient. The aforementioned 50° is thus an example.

The end face 12, which is located at the upstream end of the shut-off body 11, will preferably extend at an angle γ (FIG. 4c) which is a few degrees smaller than the previously discussed natural angle of inclination/slide-off angle of the powdered ingredient. The inclination of the end face 12 of the shut-off body 11 will in particular be 5 to 10° smaller than the natural angle of inclination/slide-off angle of the powdered ingredient. The angle γ of the inclination of the end face 12 of the shut-off body 11 will thus in particular have a value in the range of from 40-45°. Since, in a horizontal tube, the natural angle of inclination/slide-off angle of powdered ingredients for drink tends in practice to be approximately 50° or greater, a shut-off body with an end face at an angle of 40-45° can be used for a broad range of powdered ingredients.

FIG. 4B shows the state in which the shut-off valve has just been slid back from the shut-off position to the release position and in which the conveyor screw 6 is not yet in operation. In this state the angle of inclination of the powdered ingredient will be approximately equal to the angle of inclination of the end face 12 of the shut-off body 11, i.e. the angle of inclination of the powdered ingredient is at that moment smaller than what is known as the natural angle of inclination/slide-off angle. This renders it substantially impossible for particles of powdered ingredient to roll over the threshold plate 9 during opening of the shut-off valve.

By keeping the angle of inclination γ of the end face 12 of the shut-off body 11 sufficiently large, in particular greater than 30°, more preferably 40° or greater, it is possible to ensure that the shut-off valve 10 can open of its own accord on activation of the conveyor screw 6, should the operator have forgotten to return the shut-off valve 10 to the opened position by hand. The pushing force, acting on the shut-off body on activation of the conveyor screw 6, of the powdered ingredient will then have a component which extends parallel to the longitudinal axis of the conveyor screw 6 and is sufficiently large to move the shut-off valve 10. This combats damage to a component of the holder assembly.

With reference to FIG. 5, pulverization of particles of powdered ingredient between the upper edge 14 and the shut-off body 11 is prevented by, on the one hand, making the thickness d of the threshold plate 9 smaller than 2 mm, or at least the thickness of the threshold plate in proximity to the free edge 14 thereof, and/or, on the other hand, by bevelling (as illustrated in FIG. 5) or rounding the downstream side of the threshold plate 9.

By designing the shut-off valve 10 in such a way that in the shut-off position the shut-off body 11 is slid completely above or even in the upstream direction past the threshold plate 9, the powdered ingredient is pressed back during shutting-off to (in the upstream direction) after the threshold plate 9. This produces very reliable shutting-off with a significantly reduced, if not very low risk of powdered ingredient being spilt during shutting-off or during the shut-off state.

LIST OF REFERENCE NUMERALS

1=Holder assembly
2=Mixing unit
3=Cup
4=Powdered ingredient
5=Holder
6=Conveyor screw
7=Outflow channel
8=One end of the conveyor screw
9=Threshold plate
10=Shut-off valve
11=Shut-off body
12=Upstream end face of the shut-off body
13=Longitudinal axis of the conveyor screw
14=Free edge of the threshold plate
15=First tube part
16=Second tube part
17=Water supply system
18=Mixing chamber
19=Mixing member
20=Motor of the mixing member
21=Means for driving the conveyor screw
22=Dispensing part of the outflow channel
23=Cap of the shut-off valve
24=Clamping edge of the shut-off valve
25=Guide of the shut-off valve
26=Flange on the second tube part
27=Flange on the first tube part
28=Recess
29=Locking hook
30=Base of the holder
31=Plate
32=Arrow in FIG. 2
γ=Angle of inclination of the upstream end face
d=Thickness of the threshold plate
L=Longitudinal direction of the conveyor screw
R=Conveyor means of the conveyor screw, downstream direction
S=Reciprocating displaceability of the shut-off valve

The invention claimed is:

1. A holder assembly (1) for a powdered ingredient (4) for preparing an instant drink, comprising:
a holder;
a conveyor screw (6) provided in the holder (5) along the base (30) of the holder;
an outflow channel (7) provided on the holder (5) for dispensing that ingredient (4), an end (8) of the conveyor screw (6) protruding into the outflow channel (7), the outflow channel (7) extending in a longitudinal direction (L) of the conveyor screw (6);
a threshold plate (9) which extends transversely to the longitudinal direction of the conveyor screw (6) and which is attached in the outflow channel (7) downstream of that one end (8) of the conveyor screw (6);
a shut-off valve (10) arranged at an outflow opening of the outflow channel (7), the outflow opening being situated at a longitudinal end of the outflow channel (7), near the threshold plate (9);
wherein the shut-off valve (10) comprises a shut-off body (11) which shut-off valve (10) and shut-off body (11) can be moved back and forth over the longitudinal end of the outflow channel (7) comprising the outflow opening, by hand, in the longitudinal direction (L) of the conveyor screw (6) between a release position (FIG. 4B and FIG. 4C) and a shut-off position (FIG. 4A);
the shut-off body (11) being located in the release position on the downstream side of the threshold plate (9) and the outflow opening, set apart from that threshold plate (9) and the outflow opening;
the shut-off body (11) being located in the shut-off position, viewed in a direction transversely to the longitudinal direction (L) of the conveyor screw (6), next to the threshold plate (9) and, in the transversal direction, being shaped in such a way that the shut-off body (11) and the threshold plate (9) together shut off the outflow opening of the outflow channel (7); and
wherein the shut-off body (11) is shaped in such a way that the shut-off body (11) protrudes in the shut-off position, viewed from the downstream side of the threshold slate (9) in the upstream direction, along and past the threshold plate (9) on the upstream side of the threshold plate (9).

2. The holder assembly (1) according to claim 1, wherein the upstream end face (12) of the shut-off body (11) extends at such an inclination (γ) that this end face (12), viewed in the shut-off position and looking from the conveyor screw (6) in the downstream direction, runs obliquely toward the threshold plate (9).

3. The holder assembly (1) according to claim 2, wherein this inclination encloses with the longitudinal axis (13) of the conveyor screw (6) an angle (γ) of from 30° to 60°.

4. The holder assembly (1) according to claim 1, further comprising:
wherein the threshold plate (9) has a free edge (14) which, in the shut-off position, is turned toward the shut-off body (11); and
wherein the free edge (14) is bevelled or rounded on the downstream side of the threshold plate (9).

5. The holder assembly (1) according to claim 4, wherein the holder (5) further comprises powdered ingredient (4) for preparing an instant drink, and wherein said free edge (14) is bevelled or rounded in such a way that, when the free edge (14) extends horizontally, powdered ingredient (4) lying on the free edge (14) falls from the free edge (14).

6. The holder assembly (1) according to claim 4, wherein the threshold plate (9), or at least the free edge (14) thereof which is turned in the shut-off position toward the shut-off body (11), has a thickness (d) which is at most 2 mm.

7. The holder assembly (1) according to claim 1, wherein the shut-off valve (10) is provided on the holder assembly (1), in particular the outflow channel (7), in a way that the shut-off valve (10) is displaceable in the downstream direction (R) counter to a resistant force, which resistant force is of a magnitude that, on the one hand, the shut-off body (11) can be slid back toward the release position under the influence of ingredient (4) propelled forward by the conveyor screw (6) and that, on the other hand, the shut-off body cannot accidentally move of its own accord.

8. The holder assembly (1) according to claim 7, wherein the resistant force is obtained by clamping fastening of the shut-off valve (10) to the holder assembly (1), in particular the outflow channel (7).

9. The holder assembly (1) according to claim 7, wherein the resistant force has a value in the range of from approximately 0.5 N up to and including approximately 10 N.

10. The holder assembly (1) according to claim 1, wherein the outflow channel (7) comprises a first tube part (15) which is fastened to the holder (5) so as to be able to rotate about the longitudinal axis of that tube part, and wherein the threshold plate (9) and the shut-off valve (10) are provided on that first tube part (15) to be rotatable, at least in the shut-off position, together with that first tube part (15) with respect to the holder (5) about the longitudinal axis of the outflow channel (7).

11. The holder assembly (1) according to claim 10, wherein that first tube part (15) is fastened to the holder (5) in a detachable and recouplable manner.

12. The holder assembly (1) according to claim 11, wherein the outflow channel (7) comprises a second tube part (16) which is fastened to the holder (5), which extends concentrically in the first tube part (15), and which acts as a bearing for the rotatable first tube part (15), and wherein the aforementioned one end (8) of the conveyor screw (6) protrudes into this second tube part (16).

13. The holder assembly (1) according to claim 12, wherein the second tube part (16) has an internal diameter corresponding substantially to the external diameter of the conveyor screw (6) in such a way that this second tube part (16) acts as a bearing for the conveyor screw (6).

14. The holder assembly (1) according to claim 1, wherein the holder (5) further comprises powdered ingredient (4) for preparing an instant drink.

15. A drink preparation means for preparing an instant drink, wherein the drink preparation means comprises:
- at least one holder assembly (1) according to claim 1;
- a mixing unit (2) for mixing and dissolving powdered ingredient (4) originating from the holder assembly (1) with or in water; and
- a water supply system (17) for supplying water to the mixing unit (2).

16. The holder assembly (1) according to claim 7, wherein the resistant force has a value in the range of from approximately 1 N up to and including approximately 5 N.

17. The holder assembly (1) according to claim 7, wherein the resistant force has a value in the range of from approximately 1 N up to and including approximately 3 N.

18. The holder assembly (1) according to claim 3, wherein the angle ($\gamma$) is from 40° to 45°.

* * * * *